DIAL TELEPHONE SYSTEM EMPLOYING SENDERS WITH CARD TRANSLATORS

Filed June 23, 1952 7 Sheets-Sheet 1

INVENTOR.

Judson O'D. Shepherd

INVENTOR.

Judson O'D. Shepherd

May 13, 1958 J. O'D. SHEPHERD 2,834,835

DIAL TELEPHONE SYSTEM EMPLOYING SENDERS WITH CARD TRANSLATORS

Filed June 23, 1952 7 Sheets-Sheet 3

INVENTOR.

Juston O'D. Shepherd

May 13, 1958 J. O'D. SHEPHERD 2,834,835

DIAL TELEPHONE SYSTEM EMPLOYING SENDERS WITH CARD TRANSLATORS

Filed June 23, 1952 7 Sheets-Sheet 4

INVENTOR.

Judson O'D. Shepherd

DIAL TELEPHONE SYSTEM EMPLOYING SENDERS WITH CARD TRANSLATORS

Filed June 23, 1952 7 Sheets-Sheet 5

INVENTOR.

Judson O'D. Shepherd

DIAL TELEPHONE SYSTEM EMPLOYING SENDERS WITH CARD TRANSLATORS

INVENTOR.

DIAL TELEPHONE SYSTEM EMPLOYING SENDERS WITH CARD TRANSLATORS

Filed June 23, 1952 7 Sheets-Sheet 7

INVENTOR.

Judson O'D. Shepherd

United States Patent Office 2,834,835 Patented May 13, 1958

2,834,835

DIAL TELEPHONE SYSTEM EMPLOYING SENDERS WITH CARD TRANSLATORS

Judson O'D. Shepherd, Atlanta, Ga.; Margaret F. Shepherd, executrix of said Judson O'D. Shepherd, deceased Application June 23, 1952, Serial No. 295,044

12 Claims. (Cl. 179—18)

This invention relates to dial telephone systems, particularly those of the step-by-step type. It is directed toward improvements in such systems by providing flexibility in the switching and trunking arrangements, which is not feasible in the usual step-by-step systems functioning directly from dial pulses. This is accomplished by incorporating in such systems a directing or sender element which controls the switches of the system, or a portion of them. Included in the sender arrangements is a card translator in accordance with the disclosure of my copending application Serial No. 161,968, filed May 15, 1950, now Patent No. 2,605,965, dated August 5, 1952, of which the present application is a continuation-in-part.

In the preferred embodiment of this invention, as applied to a step-by-step system, the telephone subscriber removes his receiver or handset, whereupon his line is found in the conventional manner and is extended to a regular first selector. A conventional link extends the tip and ring conductors between the line finder and first selector to a sender in accordance with the present invention. The sender returns dial tone and the subscriber dials the wanted number (assumed to be a local number) which may be of the two-five type, or ABX–XXXX, of which "AB" are the first two letters of an office name and the "X's" are numerals. A register preferably of the type disclosed in my Patent No. 2,301,823, dated November 10, 1942, will register the digits as dialed. When the first three digits (ABX) have been registered, the sender is connected to a card translator by means of a conventional link and furnishes the digits "ABX" to the translator for translation. Digits "ABX" designate the office from which the called member is served. The translator returns to the sender and registers therein the digits resulting from the translation function which are required to be transmitted to reach the called office in conformance with the switching or trunking plan of the exchange, and the number of digits the sender is required to transmit to reach the called telephone. The magnitude of each of the digits and the number thereof to reach the called office may be quite different from the office code which was dialed. The card translator then disconnects itself. The sender then transmits the translated office code as step-by-step impulses to reach the called office. It then transmits the last four digits of the called number as contained in the original register, and then disconnects itself from the connection.

Where the call is for a customer toll dialed connection, which is in the form of X1X–ABX–XXXX, in which the "X1X" is the toll dialing numbering plan area code, "ABX" the called central office in that area and "XXXX" the called number, the card translator translates the "X1X" into a routing code to the toll dialing equipment of the exchange (assumed to be of common control type having senders), and after it reaches the toll dialing equipment it then transmits all ten digits to this equipment untranslated from the original registration, so that the toll dialing equipment may select a circuit to the called point and control switches thereat to reach the called number, and perform other functions.

It is a feature of the invention that the card translator will provide the sender with routing information to conform with various trunking plans for an exchange, which may require routing codes of one, two or three digits (or even more). Another feature is that it may be used in conjunction with a centralized tandem or tandems of either the step-by-step or crossbar type, or both types in the same exchange, in which case it may route the call to said tandem or tandems by one, two or three digits as necessary, and may furnish said tandem with the full, untranslated number to actuate said tandem to complete the call. Where the tandem is of the step-by-step type, it may route the call thereto by a single digit routing code and may actuate said tandem with two digits to pick a trunk to the called office, the three digits to reach the called office being translated from the "ABX" code dialed by the calling subscriber.

Another feature of the invention is the translation of a part of the called number to select a route to a distant switching location in the local area, such as a tandem or toll dialing unit, and when that point is reached to transmit thereto the entire, untranslated number as originally dialed.

Still another feature is means to control the sender so that it will transmit a variable number of digits of proper magnitude for the various call routings as determined by information translated from the first three digits dialed.

A still further feature is the employment of card translators having a capacity for making upwards of 1,000 different translations but employing only 110 translator cards, and with the card translators few in number being connected momentarily to a sender handling a call to translate registered call information for that sender.

Other features will be understood from the general and detail description of the invention which follows.

The invention is disclosed principally by circuit schematics by means of seven sheets of drawings comprising eight figures, as follows.

*General description*

Figure 2:
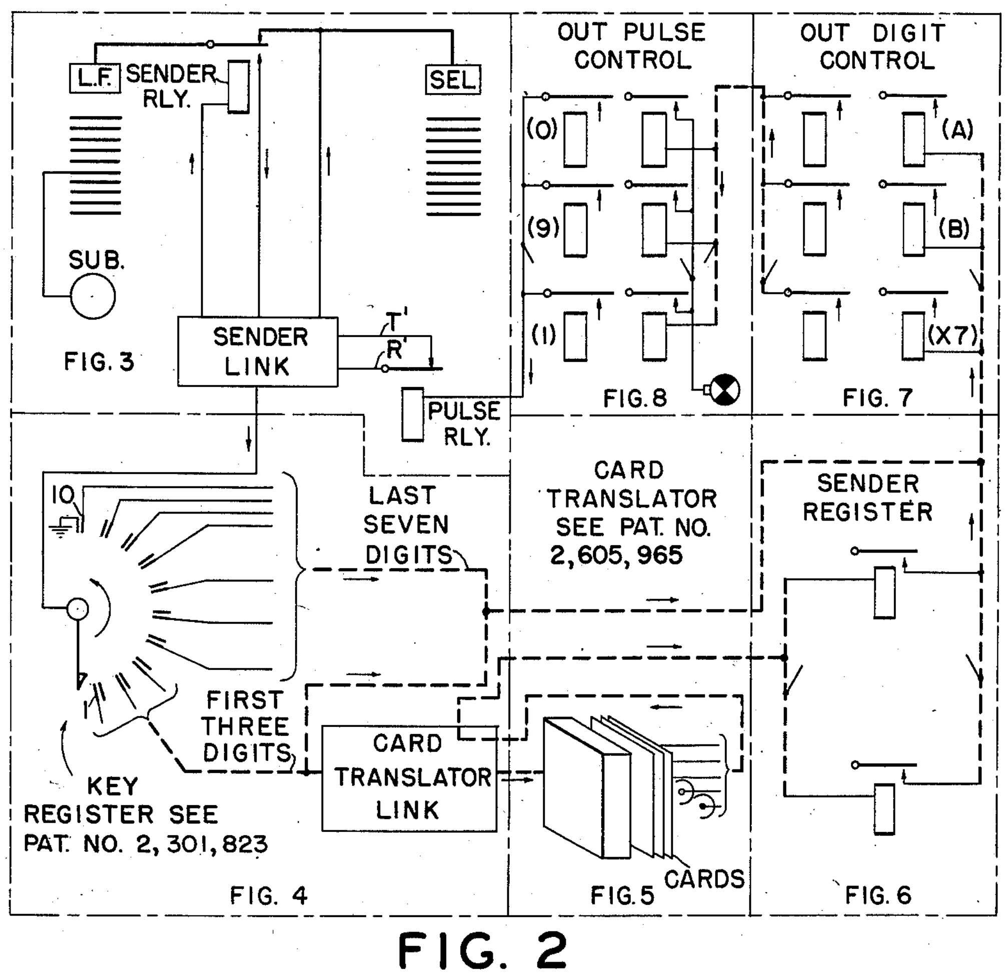
Figure 2 is a schematic for orientation of the various portions of the circuit toward facilitating a general understanding of the overall circuit arrangement and its general functions.
Figure 1:
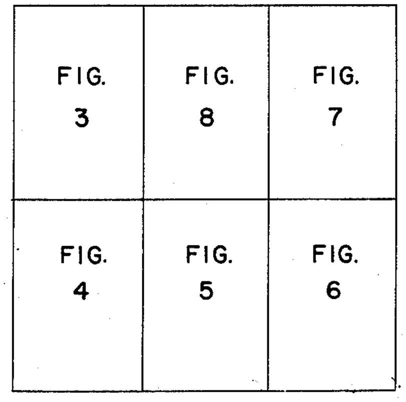
Figure 1 is a diagram showing how the several sheets of the drawings may be arranged to set out the invention.

Figure 2 is a one-line skeleton diagram for the purpose of general orientation in the functioning of the circuits described herein in detail. The general flow of information is indicated by arrows. Referring to Figure 2, thereof, the subscriber in placing a call removes his receiver resulting in his line being found by the line finder (LF). This operates the line and hold relay in the selector (SEL), returning hold ground over the sleeve conductor (not shown) to the line finder. This sleeve ground results in a start circuit being provided for the Sender Link. This link on the one hand has access to line finder-selector circuits and on the other hand to numerous senders. As soon as a sender is associated with the line finder-selector circuit, the sender relay is operated, cutting the incoming tip and ring conductors through the sender link to the sender. Dial tone is returned to the calling subscriber who then dials the desired number.

Figure 4:
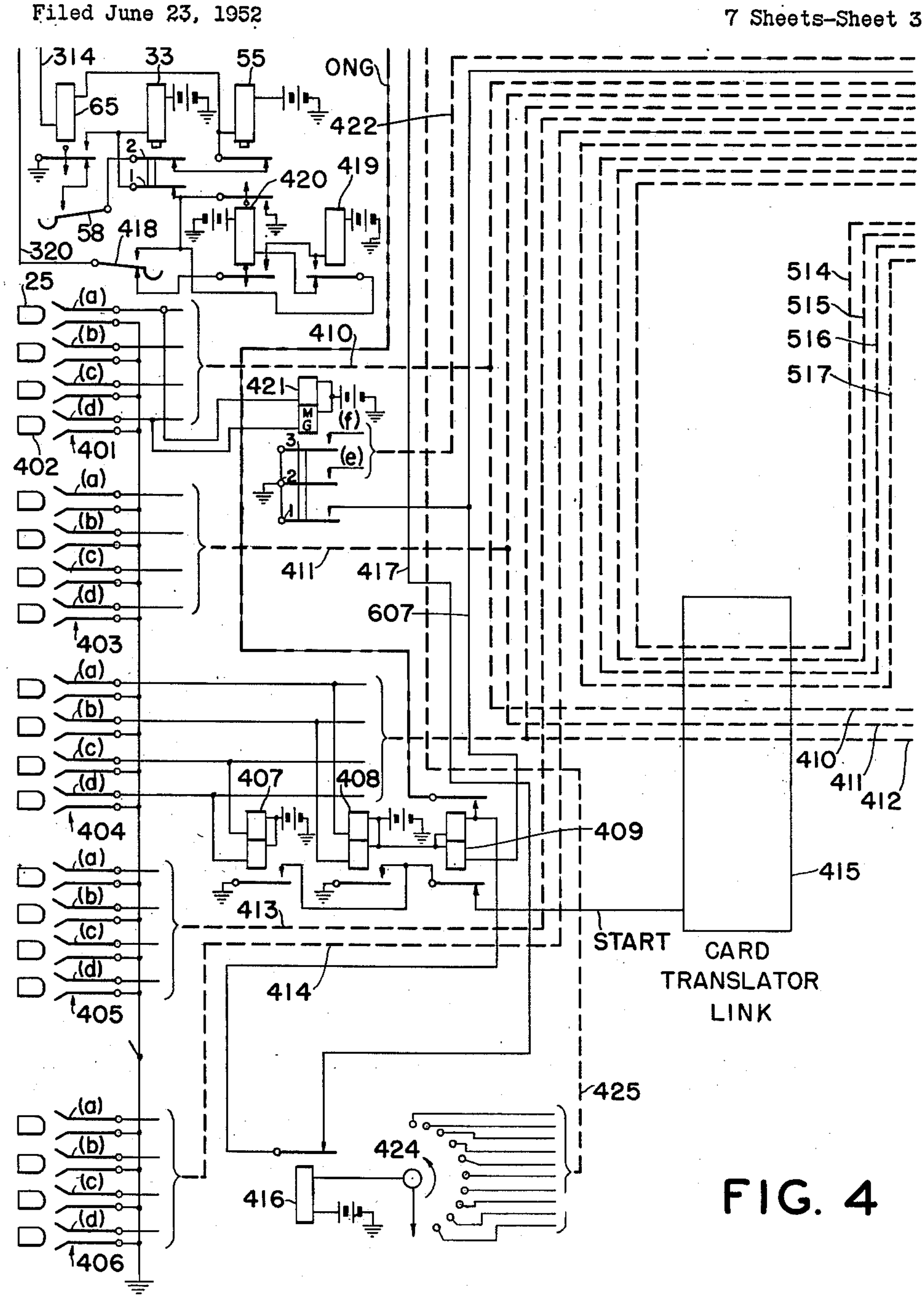
Figure 4 is a schematic of a register in accordance with the disclosure of my Patent No. 2,301,823, controls therefor and a conventional link whereby this register may be associated with a card translator.
Figure 5:
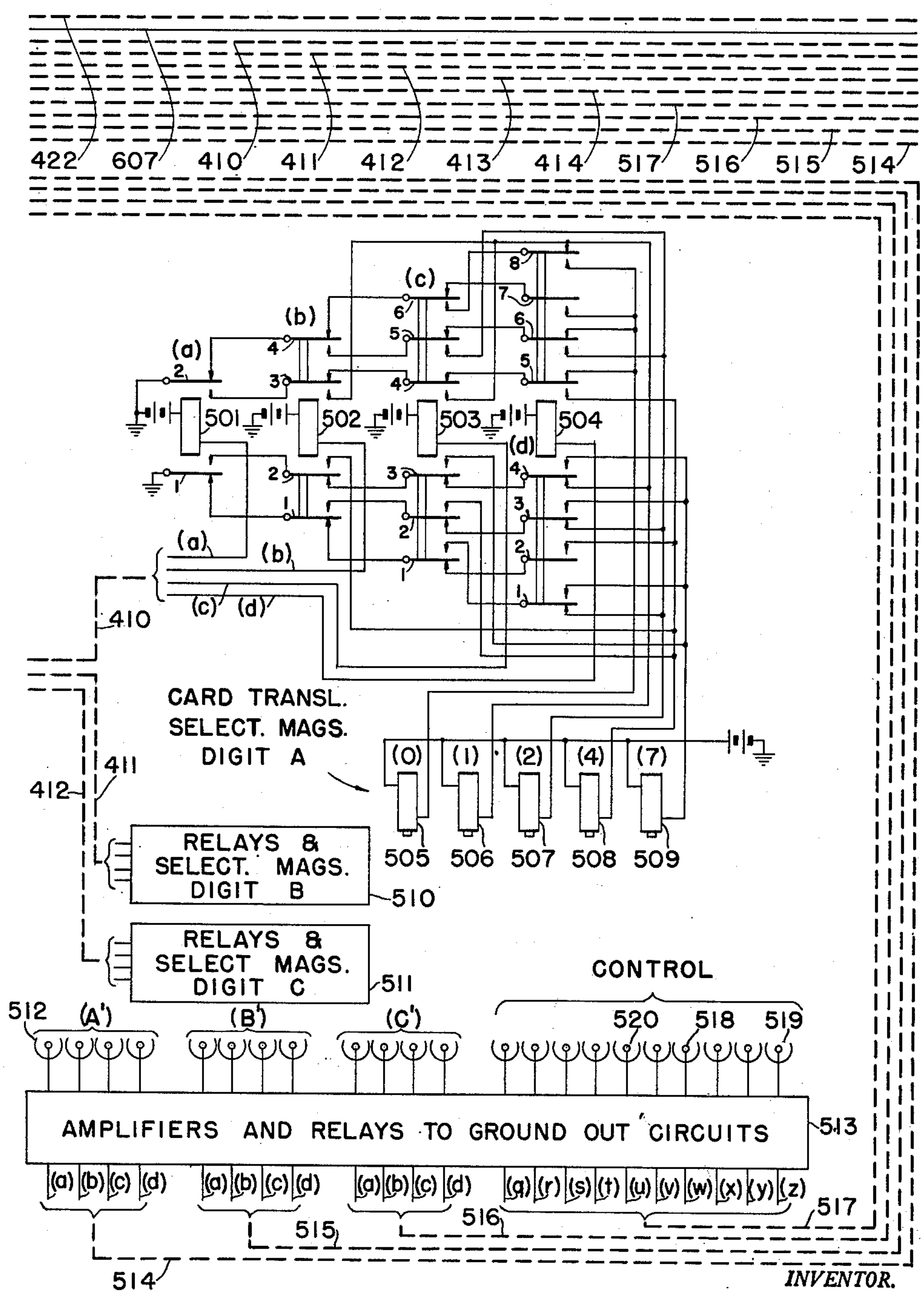
Figure 5 is a card translator in accordance with the disclosure of my Patent No. 2,605,965 and controls therefor.

The sender contains a register constructed preferably in accordance with the disclosure of my Patent No. 2,301,-823, slightly modified as will be described. It is assumed that the numbering plan of the telephone exchange will be of the 2–5 type, in which there are two letters plus one digit representing an office, and four digits designating the called telephone in that office, as mentioned above. Translation is desirable for the first three digits, i. e., two letters and the first numeral indicating the called office (ABX). When the first three digits are registered, a Card Translator in accordance with my Patent No. 2,605,965 is connected to the register by means of a Card Translator Link (Fig. 4). The first three digits are transferred to this translator and are translated into numerous items of information which are registered via the card translator link on relays in the Sender Register (Fig. 6) and the Out Digit Control (Fig. 7), and the card translator is released. When these items of information are registered, they contain information for the Out Digit Control (Fig. 7). The latter is essentially a counting chain of relays controlling the transmission of translated information received from the card translator (Fig. 5) and the sender register (Fig. 6), and also untranslated information from the original key register (Fig. 4). These circuits (Figs. 6 and 7) select the source of information to be transmitted in the form of digits, whether from the sender register (Fig. 6) or the original register (Fig. 4), and determine from the translated information the number of digits to be transmitted.

Figure 7:
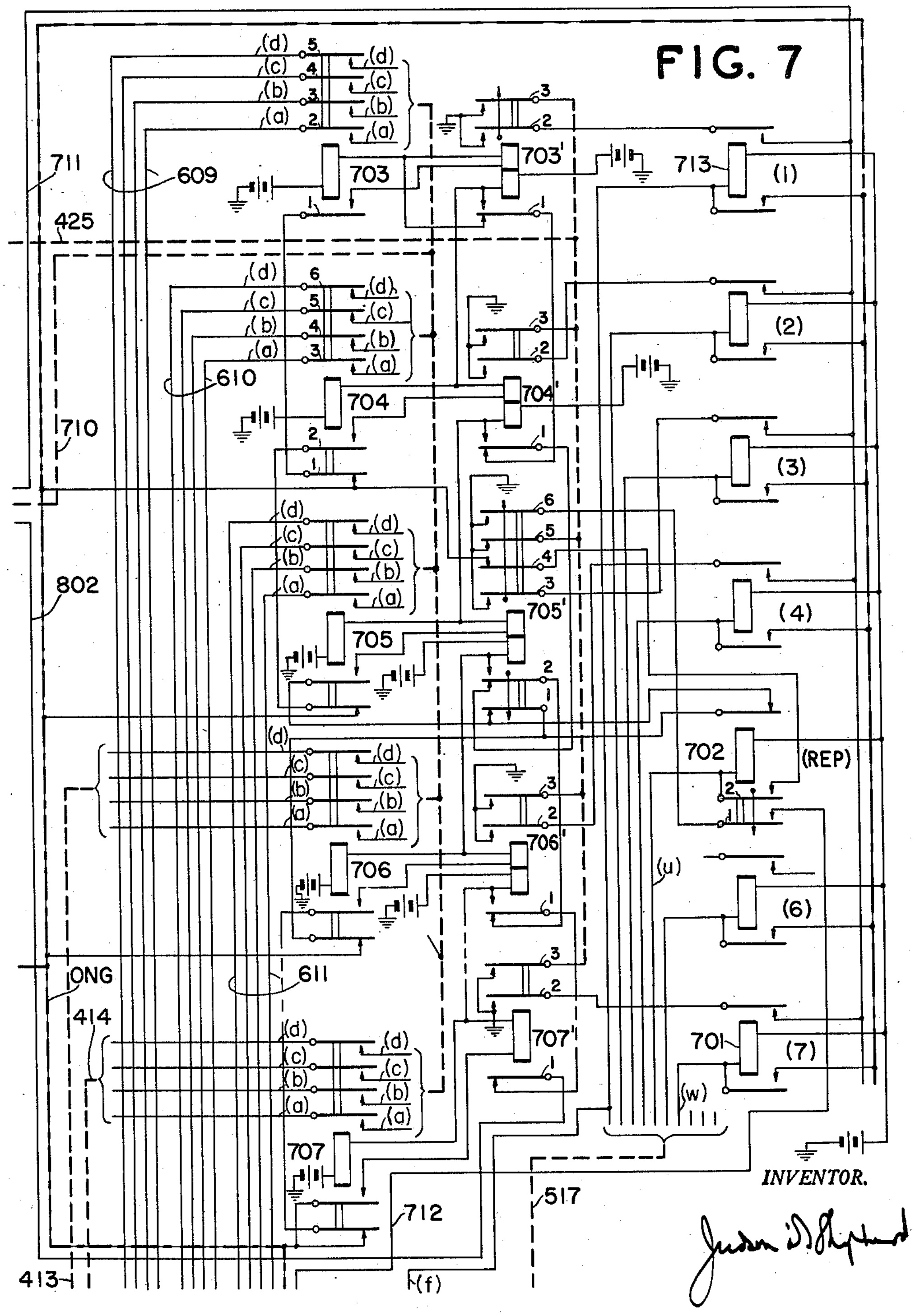
Figure 7 is the out digit control which principally controls the number of digits to be transmitted.
Figure 8:
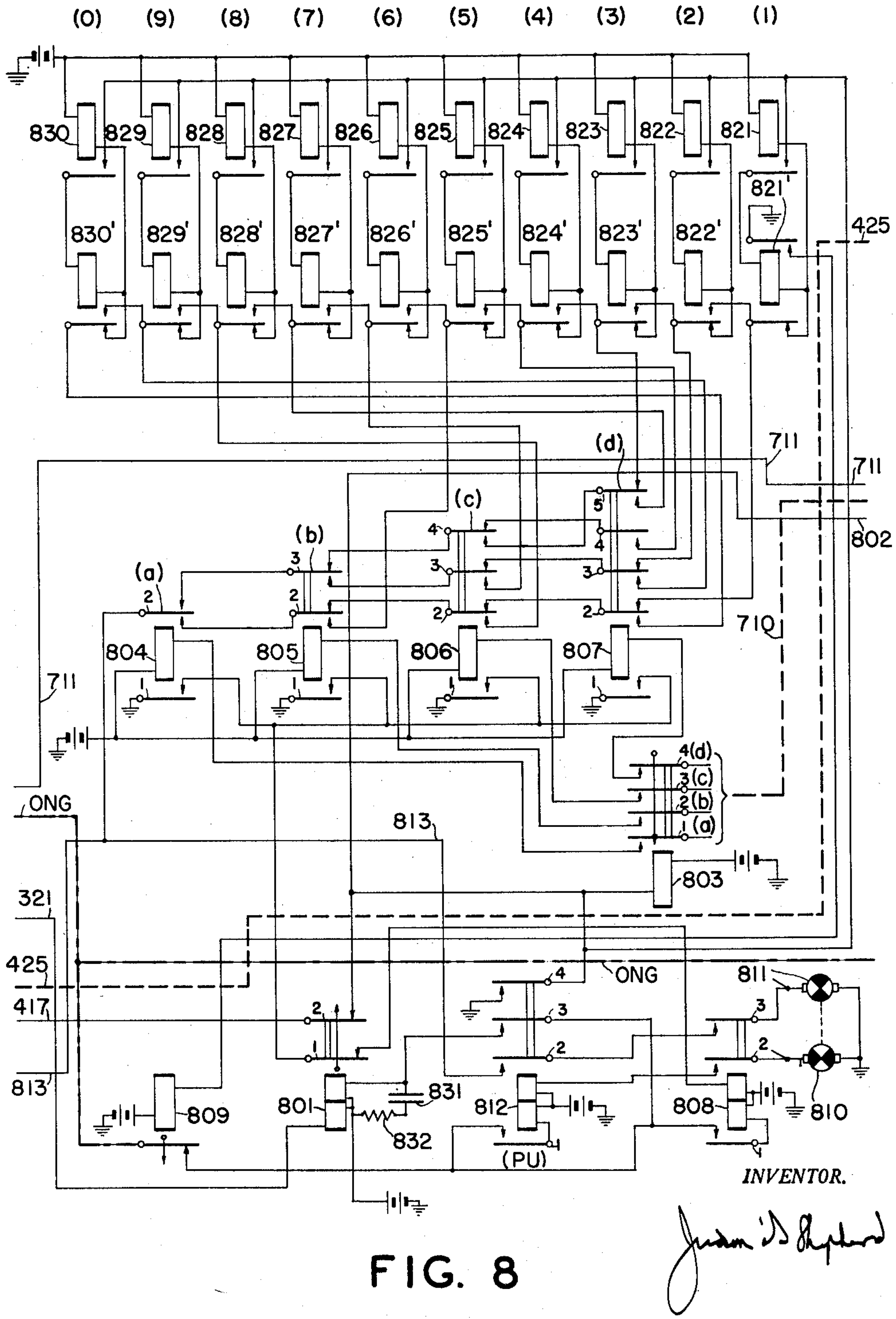
Figure 8 is the out pulse control which counts the pulses to the proper number for each digit, whereupon it stops out pulsing and provides the interdigital pause between digits.

The Out Digit Control (Fig. 7) controls the transmission of outgoing pulses by the Out Pulse Control (Fig. 8). The latter circuit is essentially a counting chain for the purpose of counting the number of pulses in each digit transmitted. It is connected to a machine-driven interrupter, and as each pulse of a digit is transmitted, the counting chain counts down a step, stopping the pulsing for an interdigital pause when the proper number has been sent forward. It controls a Pulse Relay in Fig. 3 which pulses the fundamental loop to the selector and other equipment beyond. When the proper number of digits has been transmitted, the Out Digit Control circuit releases the sender link and the sender restores to normal.

This arrangement is particularly well adapted for use with customer toll dialing. Such dialing contemplates the United States and Canada being divided into numbering plan areas, each designated by three digits, and within each numbering plan area there will be no central office having the same office designation. The area codes have either a "1" or a "0" as the second digit and, therefore, distinguish over central office designations in which the second digit is never "1" or "0." This requires the transmission of ten digits, three for the numbering plan area, three for the office and four designating the called number. By the arrangement herein described, the customer may merely dial these ten digits. The first three of these will be translated by the card translator into a route to the centralized toll equipment and the intervening switches will be actuated to reach said equipment. The herein described device will then "cut back" and will transmit the entire ten digits untranslated, since the toll equipment will need the first three digits to route the call to the distant area, together with the remainder of the digits to reach the office therein and the called number. The arrangement described immediately above contemplates the toll equipment being of common control type, as is now known to the art as the No. 4, No. A–4–A, No. 4–A and No. 5 types. Should the toll equipment be of the step-by-step or equivalent type, the presently described device may route the call to such equipment by the use of one transmitted digit to actuate the first selector to reach this toll equipment, leaving two digits to actuate such equipment to reach the distant city, thereby making 100 different toll routes available to such cities. It will be observed from what follows that the card translator enables up to three digits to be transmitted to reach a local office, toll dialing equipment or a tandem, and these may be entirely different from the first three digits it received.

This invention will first be described in connection with a local 7-digit call, and other types of calls will subsequently be considered.

*Seizure*

When the subscriber 301 removes his receiver or handset, by conventional means his line will be found by line finder 302. It is to be understood that line 303 represents the usual tip and ring conductor extending from the central office to the telephone. The finding of the line will result in the tip (T), ring (R) and sleeve (S) circuit being extended to a first selector. A line and hold relay (not shown) in the first selector will operate, returning hold ground to the line finder over sleeve conductor (S) 305, thereby holding the line finder in its operated position. This ground circuit on conductor 305 may be traced through the armature and back contact of relay 306 to the Sender Link via conductor 307.

The sender link comprises means for connecting a plurality of conductors from the upper part or originating portion of the circuit to a sender below it on Fig. 3 and on other sheets of the drawings. Such links are familiar to the art and a detailed description of it seems unnecessary. The general subject of links is treated in "The Design of Switching Circuits" by Keister, Ritchie and Washburn (D. Van Nostrand Co., Inc.), chapter 14. My Patent No. 2,522,000 also discloses several links. In the link herein contemplated any one of a plurality of originating circuits may be connected to an idle one of a plurality of senders. A step-by-step or crossbar link may be employed by minor modification of the circuits shown.

Ground on start lead 307 will cause the link to seize the originating portion of the circuit having the call requiring a sender and will seize an idle one of a plurality of senders and connect it to said originating portion of the circuit. When the sender is attached, ground is extended by the link over conductor 308 to operate relay 309 over an obvious circuit. Operation of relay 309 at armatures and continuity contacts No. 2 and 3 extends the (T) and (R) conductors from the line finder through the link and then through the double windings of relay 310. The ring conductor (R) extends through the upper winding of relay 310 to battery, and the tip conductor (T) through the lower winding of relay 310, the No. 2 contacts of relay 311, the secondary of transformer 312 to ground. Dial tone is provided to the calling subscriber by this transformer. Relay 310 operates and completes an obvious circuit from ground at its front contact to operate hold relay 313. The latter relay at its No. 1 front contact grounds a hold circuit ONG for the sender. This conductor ONG is uniquely designated and it will be understood that it provides off-normal ground wherever it appears in the several figures. This hold circuit also serves to hold the link operated. At its No. 2 armature and contact, it grounds the sleeve circuit 305, which serves to maintain the hold condition for the line finder since when the (T) and (R) conductors between the line finder and selector may be interrupted by operation of relay 309, the first selector may take a step upwards and then fall back, and will also after a brief interval open the ground circuit it had been maintaining for the line finder. The operation of relay 309 through ground on armature and front contact No. 1 provides an obvious operating circuit through the upper winding of relay 306. This relay operates and locks up to sleeve (S) ground by an obvious circuit including the lower winding of relay 306. The link start circuit over conductor 307 is opened by the operation of relay 306. The latter relay is slow-to-operate to assure that relay 313 has opportunity to operate to provide ground to hold the link before the link start circuit is opened.

Receipt of dial tone advises the calling subscriber that he may commence dialing. Let it be assumed that he desires number AB5–1234. When the dial is restoring to normal after being pulled around to "A" (digit 2), the first interruption of the pulsing springs thereof will cause relay 310 to release momentarily, causing a pulse to be extended from ground at the armature of relay 310, No. 3 armature and front contact of relay 313, the upper winding of relay 311 to battery, causing this relay to operate and lock up from battery, its lower winding, its No. 1 armature and front contact and to off-normal ground ONG. Operation of relay 311 will, at its No. 2 contacts, substitute direct ground for dial tone ground, thereby suspending dial tone to the subscriber. At its No. 3 contacts it closes a loop to the first selector through the winding of polarized relay 318 and the contacts of relay 317.

*Registration of called number*

A register for the called number is shown by Fig. 4. This register, in the preferred embodiment of this invention, comprises the device disclosed by my Patent No. 2,301,823, with slight modification as will be set out below. It will be understood that other known circuit arrangements can be used for registering the called number, and these may be relays, a cross-bar switch, cold cathode tubes or other suitable means. The circuit will be described in connection with the device of latter said patent, and the reference characters of this patent will be used where applicable, being recognized as being of the patent by virtue of the 2-digit type, and other 2-digit reference characters mentioned herein but not shown will be found in said patent.

When the first pulse is provided by the momentary release of relay 310, said pulse is extended via conductor 314 through the winding of relay 65 and the code drum magnet 55 to battery, causing slow-to-release relay 65 to operate in series with magnet 55, which also operates. Subsequent reclosure of the pulse contacts of the telephone dial will reoperate relay 310 and interrupt the circuit over conductor 314. As a result of this, magnet 55 will release causing the code drum to be advanced one step. The subsequent opening of the dial pulse contacts will result in a second momentary pulse being received over conductor 314, causing magnet 55 to position its armature again and, upon suspension of latter said pulse, it will release to drive the code drum to position No. 2. Relay 65 maintains its contacts closed between pulses due to its slow-to-release characteristics. It will be recalled that the first digit dialed is an "A" (two pulses), so after receipt of the second pulse the interdigital pause will give relay 65 opportunity to release.

Magnet 33 operated upon operation of relay 65 over an obvious circuit, and it thereupon positions its pawl on its associated ratchet wheel, so that upon release of relay 65 between digits, magnet 33 will release to advance digit registering arm 31 (not shown) to cause the digit now determined by the position of the code drum 48 (not shown) to be registered on contacts 401, in accordance with the teaching of said Patent No. 2,301,823. It may be appropriate to point out here that a modification of the device of latter said patent is to provide means to restore the digit registering arm 31 to a normal or home position after each complete operation of the sender, as will be subsequently described.

It may be noted in latter mentioned patent that the registration of a digit comprises the selective rotation of metallic members such as 25 between two contact members, thereby interconnecting said contacts in accordance with a code. This code is a "one-or-two-out-of-four" type and this code used generally herein is:

| Digit | (*a*) | (*b*) | (*c*) | (*d*) |
|---|---|---|---|---|
| 1 | *a* | ------ | ------ | ------ |
| 2 | ------ | *b* | ------ | ------ |
| 3 | ------ | ------ | *c* | ------ |
| 4 | ------ | ------ | ------ | *d* |
| 5 | *a* | *b* | ------ | ------ |
| 6 | ------ | *b* | *c* | ------ |
| 7 | ------ | ------ | *c* | *d* |
| 8 | *a* | ------ | *c* | ------ |
| 9 | ------ | *b* | ------ | *d* |
| 10 | *a* | ------ | ------ | *d* |

As a result of dialing a "2" (A), contact (*b*) of the first contact assembly 401 will be grounded, and the digit registering arm 31 (not shown) will be in position to register the second digit to be dialed.

During the interdigital pause, the release of relay 65 will extend ground to code drum off-normal contacts 58 and thence through the upper armature and back contacts of magnet 33, the back contact of the code drum stepping magnet 55, the winding of magnet 55 to battery, thereby furnishing a self-interrupting circuit for the repeated operation and release of latter said magnet, causing it to operate and release repeatedly until the code drum is restored to normal whereat it is stopped by the opening of the off-normal contacts 58. This drum is now ready for the second digit.

The second digit which is assumed to be a "2" (B) is then dialed to result in the contact (*b*) of the second digit group of contacts 403 being grounded by operations similar to those described in connection with the first digit.

In a similar fashion, the third digit, which is a "5" in the assumed example, will result in contacts (*a*) and (*b*) of the third digit group of contacts 404 being grounded. In a similar fashion digits "1," "2," "3" and "4" will subsequently be registered by grounding of contacts of subsequent registration positions, all of which are not shown.

Translation is required of the first three digits or "AB5" of the example. After the third digit has been dialed, relay 408 will be operated by a circuit from ground, closed code contact (*b*) of the third group of contacts 404, the lower winding of relay 408 to battery. It will be noted that either relay 408 or 407 will be operated after the third digit, irrespective of what the digit may be, indicating translation is required and ground at the armature and contact of either of these relays thus operated will be extended through the lower armature and back contact of relay 409 to the Translator Link 415, and provides a start circuit therefor. The translator link, which may be of known type and not considered necessary for detail description herein, interconnects any sender and its register on the one hand with an idle one of a plurality of card translators on the other hand. This start circuit also serves to hold the translator until it completes its functions as will be indicated by the operation of relay 409 by a circuit to be described.

Register contact groups 405 and 406 are representative of the seven numerical digits which are registered, in addition to the office code digits which require translation. Ground on these contacts, as resulting from the registration of a digit thereon, is extended over conductor groups such as 413 and 414 to Figure 7. The first three digits (say AB5) will be referred to below as "ABC," indicating that it is the office code, and (A), (B) and (C) will be used to identify these first three digits in connection with registers and the like relating to them.

*Translation*

A card translator such as disclosed by my Patent No. 2,605,965, dated August 5, 1952, is contemplated for use in the present invention. Essential elements of this translator are shown schematically. Those elements of this translator which are provided for its general control and for checking its functions have been omitted from the present disclosure, but it is to be understood that these elements as shown by latter said patent may be provided in the practice of this invention.

The codes left standing on key sets 401, 403 and 404, which will be referred to as the (A), (B) and (C) codes will be extended through the translator link on conductor groups 410, 411, 412 to relay groups in the translator whose purpose is to translate the "one-or-two-out-of-four" code as employed with the register into the "two-out-of-five" type for use by the card selecting mechanism. It will be understood, as an alternative, that the register may be modified by adding another set of code contacts per digit, to register on a "two-out-of-five" code basis. This probably would be preferable for the "two-out-of-five" type code permits checking features to be incorporated into the device and eliminates the need for the relay group to translate from "one-or-two-out-of-four" code to the "two-out-of-five" type. The "two-out-of-five" code provides for the operation of two relays or the like having numerical significance in that the digit for each code comprises the operation of two, and only two, relays or the like out of five, and the magnitude of the digit is defined by the sum of the numerical designations of the two relays which are operated, except that digit "0" is represented by "4" + "7." This "two-out-of-five" code as is extensively used in the dial telephone art is:

| Digit | (0) | (1) | (2) | (4) | (7) |
|---|---|---|---|---|---|
| 1 | 0 | 1 | ----- | ----- | ----- |
| 2 | 0 | ----- | 2 | ----- | ----- |
| 3 | ----- | 1 | 2 | ----- | ----- |
| 4 | 0 | ----- | ----- | 4 | ----- |
| 5 | ----- | 1 | ----- | 4 | ----- |
| 6 | ----- | ----- | 2 | 4 | ----- |
| 7 | 0 | ----- | ----- | ----- | 7 |
| 8 | ----- | 1 | ----- | ----- | 7 |
| 9 | ----- | ----- | 2 | ----- | 7 |
| 0 | ----- | ----- | ----- | 4 | 7 |

In the drawings of the present invention, parenthetical characters have been used to indicate the functional significance of many of the elements and conductors. For example, relays, contacts and conductors, etc., relating to the "one-or-two-out-of-four" code are designated (*a*), (*b*), (*c*) and (*d*); the first three digits, which are those to be translated are designated (A), (B) and (C); translated digits corresponding to the "ABC" code are designated (A′), (B′) and (C′) and the "two-out-of-five" code elements are represented by (0), (1), (2), (4) and (7).

The (A) code for the assumed called office is ground extended from contact (*b*) of register 401 over conductor (*b*) of conductor group 410 for digit "2," through the winding of relay 502 (*b*) to battery to operate said relay. A ground circuit can be traced from armature No. 1 and back contact of relay 501, No. 1 armature and front contact of operated relay 502, No. 2 armature and back contact of relay 503, No. 3 armature and back contact of relay 504, the winding of card translator selecting magnet 507 (2) to battery, thereby causing said magnet to operate. Similarly, a circuit can be traced from ground at the No. 2 armature and back contact of relay 501 serially through armature and front contact No. 4 of operated relay 502, armature and back contacts Nos. 5 and 6 or relays 503 and 504, respectively, the winding of card selecting magnet 505 (0) to battery, thereby operating magnet 505. In accordance with the "two-out-of-five" code, operation of card selecting magnets (0) and (2) designates the digit "2."

In a similar fashion, the operation of one or more relays 501–504 in accordance with the "one-or-two-out-of-four" code to designate a register digit will be translated into the "two-out-of-five" code to operate two of the card selecting magnets 505–509 for the registered digit. The grounding of conductor (*b*) of conductor group 411 for digit "2" of the second registered digit will operate a relay corresponding to relay 502 and two selecting magnets similar to 505 and 507 in "box" 510 for digit "B," thereby designating digit "2," which is the second digit dialed and registered. It will be recalled that the third digit "C" was a "5," so the register will extend through the link to the card translator ground on conductors (*a*) and (*b*) of conductor group 412, which is converted into the "two-out-of-five" code to result in the operation of card selecting magnets similar to magnets 506 and 508 in "box" 511.

The card translator of my aforesaid Patent No. 2,605,965 provides for selecting and dropping or pulling down one translator or data card in response to two digits and the dropping or pulling down of a second or block card for the third digit. In accordance with the teaching of said patent, the card translator will contain a maximum of 110 cards, 100 data cards which correspond to the 100 possible combinations of two digits and ten block cards corresponding to a third digit. As a result of operation of a pair of selecting magnets for each of digits "A," "B" and "C," a corresponding data and a block card will be dropped. It is not material which pair of digits selects the data card and which digit of the three selects the block card, although it will be preferable for digits "A" and "B" to effect selection of the data card and digit "C" to effect selection of the block card.

It will be noted that in accordance with the teachings of latter said patent, the data cards may carry ten rows of translation information each corresponding to the combined "A" and "B" digits and each of the ten block cards is arranged selectively to uncover one of these ten rows. This results in a possible 1,000 different translations. It is contemplated, for illustration, that each data card will carry twenty-two holes in each row, twelve of these holes arranged in three groups of four will provide, in accordance with the "one-or-two-out-of-four" code control of pulsing out one, two or three digits as required by the translation. The remaining ten holes will effect control functions as, for example and principally, the number of digits to be transmitted before the sender is satisfied and releases itself. Employment of ten holes for the control functions is illustrative, and either more or less may be provided in each row depending upon the application of this invention.

Figure 3:
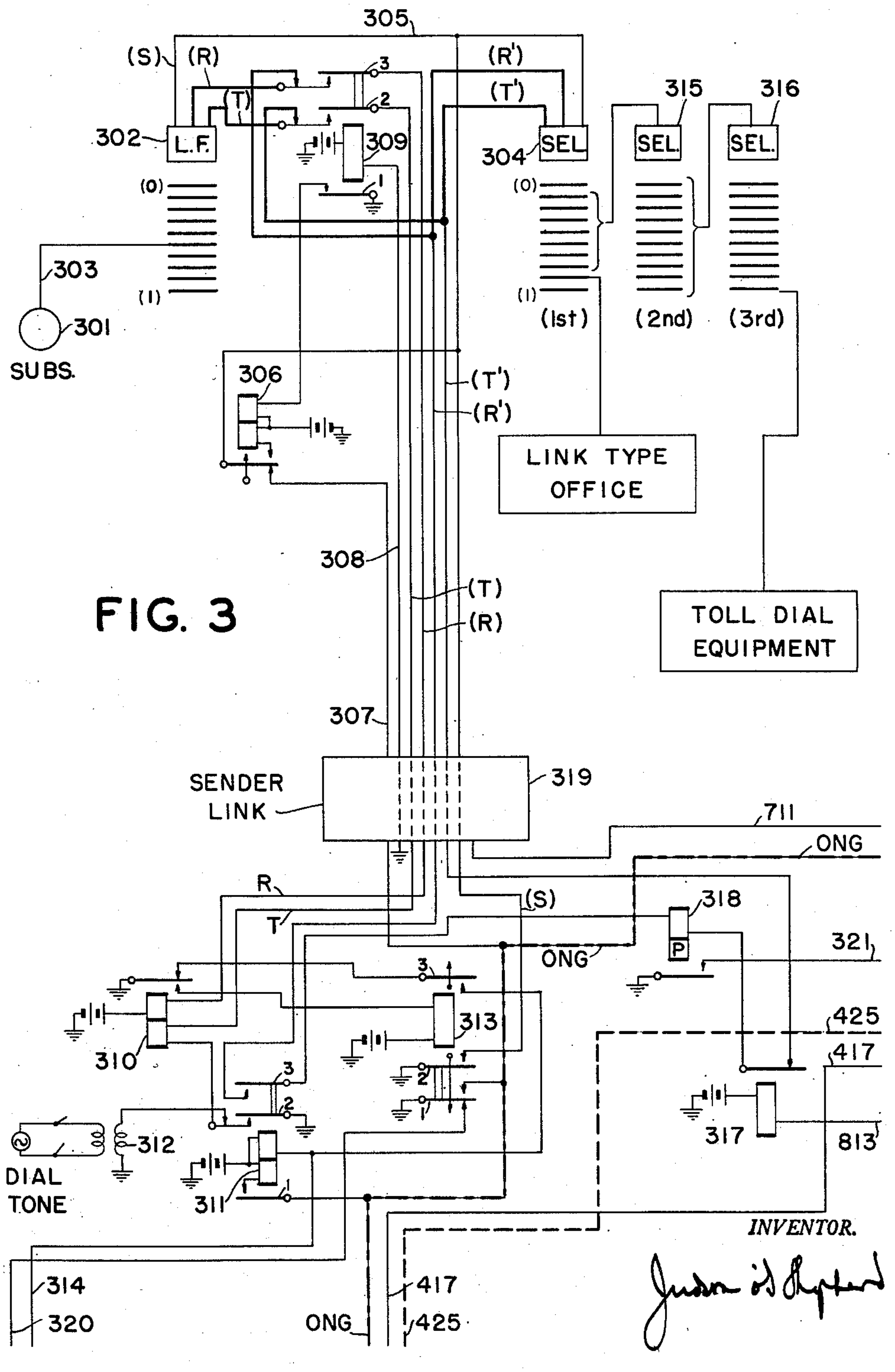
Figure 3 shows the originating portion of the unit and, by conventions, the line finder, selectors, etc., and a conventional link whereby a sender is attached thereto.

Further in accordance with the disclosure of Figure 3 of latter mentioned patent, only twenty-two photo-cells are required for translation to provide three outgoing digits and ten control functions. While use of the "one-or-two-out-of-four" code has been assumed for description of this invention, the translated digit data may be on the basis of the "two-out-of-five" code with corresponding modification of the circuit, as will be understood.

When the pair of cards is dropped corresponding to the dialed digits of "AB5" (225), the code into which "225" is translated is disclosed by excitation of one or two photo-tubes, such as 512, in each of three groups A′, B′ and C′ defining the digit to be transmitted. The "prime" marks indicate translated information, as mentioned. Let it be assumed that this translated code is "654," it being recognized that it can be substantially any one digit, two digit or three digit code, depending upon the trunking plan of the local exchange. By reference to Figure 3, the distant office "AB5" will now be designated for switching purposes as "654," and outgoing trunks to it will appear on the fourth level of the local third selector 316. Since the called number is assumed to be AB5–1234, it is necessary for the sender to transmit pulses designating 654–1234, or seven digits.

In addition to excitation of tubes (*b*) and (*c*) of group A′ (designating digit 6), tubes (*a*) and (*b*) of group B′ (designating digit 5) and tube (*d*) of group C′ (designating digit 4) will be excited. One of the control tubes (*q*)–(*z*) is also excited, advising the sender that seven digits are to be transmitted beyond, as will be later described. Had trunks to the distant office been assumed to appear on the first selector 304, the called number for switching purposes may be translated into 6–1234, of which "6" is assumed to be the first selector level upon which said trunks are connected. In this case, one of the other tubes (*q*)–(*z*) will also be excited indicating to the sender that five digits are to be transmitted beyond, upon completion of which the sender may disconnect itself from the call.

It will be understood that the digits into which the "ABC," or the office code, part of the number is translated may be predetermined by the enlarged punchings in the corresponding data card for digits "AB" and under control, of the block card dropped in response to the "C" digit. Likewise, the number of digits to be transmitted may be similarly designated. This provides substantially complete flexibility in the assignment of trunks and the number of digits to be transmitted by the sender.

The several tubes such as 512 are connected through an amplifier 513 of familiar type which may contain relays to result in grounding outgoing conductors of groups of conductors 514, 515 and 516. The amplifier or the like 513 may contain cold cathode tubes which are fired by an associated photo-tube such as 512. The control tubes when excited will result in grounding one or more of conductors (*q*)–(*z*) of conductor group 517, through the agency of relays, if appropriate. It is to be further understood that any appropriate type of photocell may be employed, including the phototransistor, with amplifier 513 modified accordingly, as will be understood.

In the case of subscriber dialing of toll calls, it is necessary for the call to be routed through the switches to the toll dial equipment, considered here as being of common control type, and for the three registered digits defining the numbering plan toll area code to be transmitted untranslated to this toll dial equipment. If it be assumed that the route to reach the toll dial equipment requires three digits, there will be a total of thirteen digits transmitted, comprising the 3-digit routing code, the 3-digit area code, the 3-digit distant office code (ABC) and four digits of the called telephone number. This requires that two of the control photo-tubes be excited, one advising the sender that it must transmit ten digits to be satisfied (the extra three digits being provided by special means to be described) and the second control tube advising the sender that after the first three routing digits, it must go back to the register and transmit untranslated all of the ten digits it contains.

In order to conserve horizontal space on the cards and thereby narrow them, the control data holes may be reduced to four or five for each row with a corresponding reduction in the number of photo-cells and associated apparatus. Assuming only four holes and four photo-cells for control purposes, this conservation arrangement contemplates that each hole and photo-cell would operate a relay associated with the card translator. These four relays may be connected in the familiar pyramid fashion and their operation one, two, three or four at a time will select and ground any one of fifteen terminals at the base of the pyramid. These base terminals can be connected to conductors of group 517 so that for any combination of relays operated there will be one conductor of said group which will have ground extended over it through the series contacts of said relays. Additional contacts on said relays may be employed to energize other conductors in group 517 since for some functions it is necessary for two such conductors to be energized, one to control the number of digits to be transmitted and the second to control the transmission of untranslated digits in the first three register positions of the register of Figure 4, as illustrated by the operation of relay 702, set out below.

*Registration of translated information*

The translation results are extended from the phototubes and amplifier 513 over conductor groups 514, 515, 516 and 517 back to the sender through link 415. These conductor groups, together with those from the ten register groups such as 401, are extended to Figures 6 and/or 7. It will be recalled that the translated information comprised "6" for the first digit (A′), "5" for the second digit (B′) and "4" for the third digit (C′). As a result of this translation, conductors (*b*) and (*c*) of conductor group 514 will have ground extended over them; also conductors (*a*) and (*b*) of group 515 and conductor (*d*) of group 516 will be grounded. Ground on conductor (*b*) of group 514 will be extended through the winding of relay 601, the winding of relay 606 to battery, causing relay 601 to operate. Likewise, ground on conductor (*c*) of conductor group 514 will result in relay 602 operating over a similar circuit. Ground on conductors (*a*) and (*b*) of conductor group 515 will result in relays 603 and 604 operating by circuits through their respective windings to battery, and ground on conductor (*d*) of group 516 will similarly cause relay 605 to be operated.

When each of relays 601, 602, 603, 604 and 605 operates, it locks to off-normal ground ONG by means of its armature and front contact No. 2.

By the means described above, any translated information up to 1,000 codes may be registered on the three groups of relay (A′), (B′) and (C′).

The illustrative calls will be recalled to be of the 7-digit local type. The translator card punchings will result in tube 518 being excited to result in ground being extended over conductor (*w*) of conductor group 517. This is for the purpose of advising the sender that seven digits are to be transmitted to the dial switches before its functions are completed and it may disconnect itself from the call. Ground on conductor (*w*) of group 517 is extended to the winding of relay 701 (Fig. 7) to battery, causing relay 701 to operate and lock up to off-normal ground ONG. The file of relays of Figure 7 above relay 701, and including 701, control the number of digits to be transmitted, and that number is indicated by a parenthetical numeral beside each such relay. An exception is relay 702 (REP), which will subsequently be described. There are ten relays in the group including relays 701 and 702, corresponding to the ten control functions of conductor group 517 (*q*)–(*z*) of the translator. This permits nine digit controls and one special control (REP). It is unlikely that in any local exchange it will be necessary to employ each one of ten digits one to ten to be transmitted. If it is appropriate, however, ten digit control relays may be provided by adding another punching position to the translator cards, another photo-cell such as 518 and another relay similar to 701 (7).

The translator has now completed its function by registering the three digit number representing the translation (A′ B′ C′) and operating a control relay such as 701 to control the number of digits to be transmitted by the sender. The card translator may now be disconnected from the sender for reuse by another sender for another call. It will be recalled that the operating circuit for relays 601 and 602 extended through the winding of relay 606, and the latter relay operates in series with these two relays. It will operate in series with any one or more relays of the (A′) register. Relay 606 will extend ground over conductor 607 to the lower winding of relay 409 (Fig. 4) to battery, causing said relay to operate and lock up to off-normal ground ONG through its upper armature and upper winding to battery. It will be recalled that the start and hold circuit for the translator link 415 resulted from operation of relay 407 and/or 408, and the start and hold circuit from ground at their armatures and front contact extended through the lower armature and back contact of relay 409 to the link. The operation and locking up of relay 409 will interrupt this start and hold circuit, resulting in the link being dismissed, thereby disconnecting itself on the one hand from the sender and from the translator on the other hand. Relay 606 is made slow to operate to assure time for other relays of group (A'), (B') and (C') and a control relay such as 701 to operate. The card translator will immediately restore to normal when the translator link disconnects.

*Out pulsing*

Figure 6:
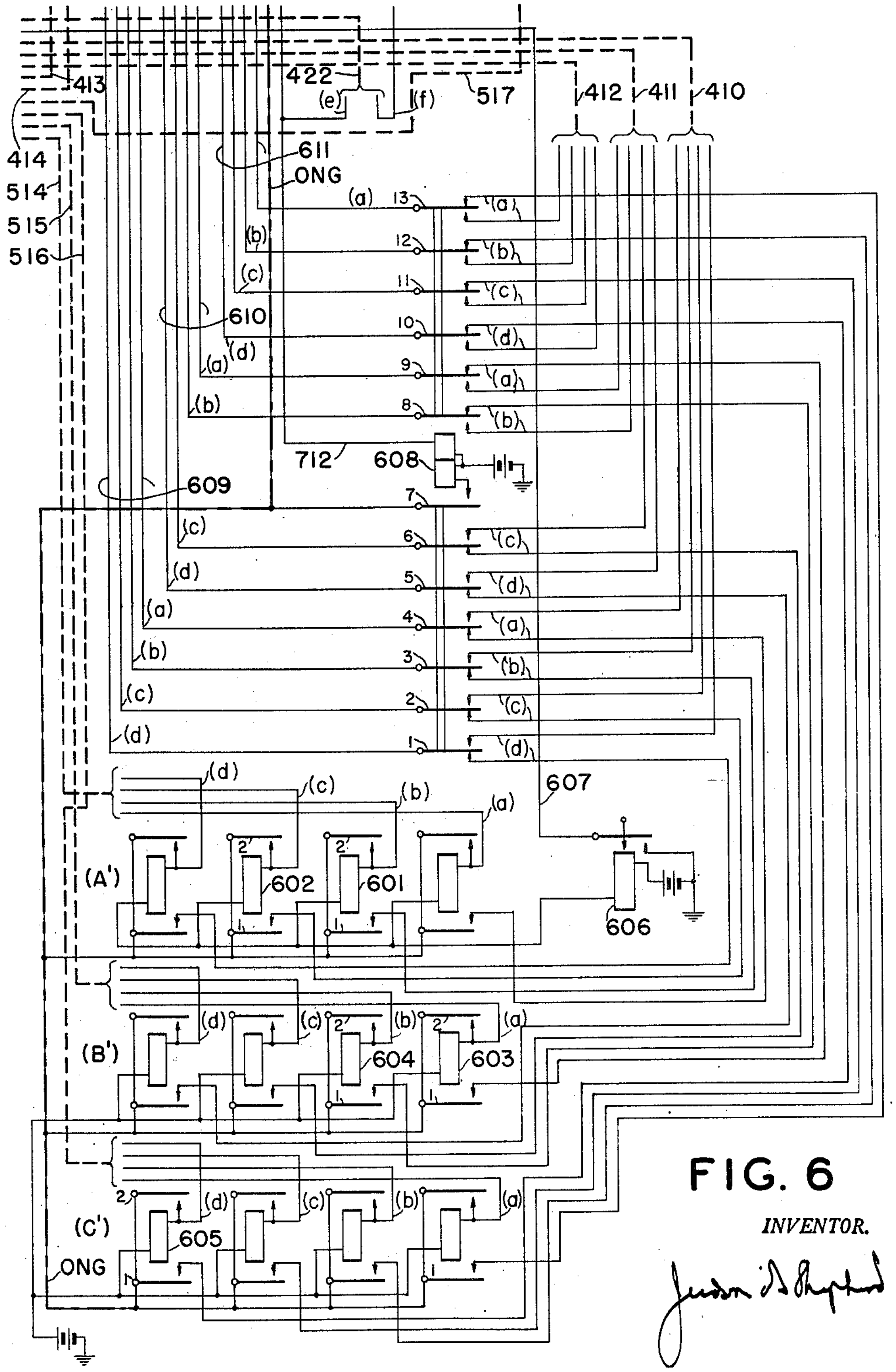
Figure 6 is primarily a register whereby the translated information from the translator may be stored.

When the translated first three digits have been registered on relay groups (A'), (B') and (C') of Figure 6, and control relay 701 has been operated and locked up, the sender may pulse the proper digits to the selectors beyond. It will be recalled that register relays 601 and 602 for digit A', relays 603 and 604 for digit B' and relay 605 for digit C' are now locked operated, as well as control relay 701. Off-normal ground is extended from the lower armatures and front contacts of relays 601 and 602, through armatures and back contacts No. 3 and 2 of relay 608, respectively, conductors (*b*) and (*c*) of conductor group 609 to armatures No. 3 and 4 of relay 703.

When the card translator has been disconnected as resulting from the operation of relay 409, indicating that the sender is ready to pulse forward, off-normal ground can be traced from the armature and front contact of relay 409, armature and back contact of relay 416, conductor 417, armature and back contact No. 2 of relay 801, conductor 802 serially through armatures and back contacts No. 1 of relays 707' and 706', armature and back contact No. 2 of relay 705', armature and back contacts No. 1 of relays 704' and 703', winding of relay 703 to battery, thereby operating the latter relay.

Ground which was previously traced to armature Nos. 3 and 4 for the first (A') digit "6" will be extended to conductor group 710 which comprises four conductors (*a*), (*b*), (*c*) and (*d*) to which the upper contacts of relay 703, 704, etc. are multipled. These ground conditions on conductors (*b*) and (*c*) will be extended to armatures Nos. 2 and 3 of relay 803. Ground extended from conductor 417 through the armature and back contact No. 2 of relay 801 and which was further extended over conductor 802 to operate relay 703 has a branch which extends through the winding of relay 803 to battery, thereby operating the latter relay. This extends the previously traced ground from conductor group 710 to armature Nos. 2 and 3 to the windings of relays 805 and 806, respectively, and thence to battery, resulting in the latter pair of relays operating to designate the digit (6). The group of relays 804–807 is for the purpose of decoding the "one-or-two-out-of-four" code into a decimal basis to control a decimal counting chain at the top of Figure 8.

Ground is extended from the lower armatures and front contacts of any relay or relays 804–807 which is operated through armature No. 1 and back contact of relay 801 through the upper winding of relay 808 to battery. The latter relay operates and locks up through its lower winding, armature and front contact No. 1, the armature and back contact of relay 809 to ground on the off-normal ground conductor ONG. The operation of relay 808 connects the "pick-up" drum 810 of a machine-driven pulse interrupter to the winding of relay 812. This machine has a pulse drum 811 which is 180° out of phase with the "pick-up" drum. The circuit from drum 810 is extended through armature and front contact No. 2 of relay 808 through the upper winding of relay 812 to battery. Closure of ground through drum 810 will cause relay 812 to operate and lock up through its lower winding to a circuit traceable through armature and contact of relay 809 to ground on the off-normal ground conductor ONG. It will be understood that an all-relay pulsing and pick-up circuit may be substituted for the machine-driven interrupter to provide dial pulses and a pick-up circuit.

Operation of relay 812 results in extension of a circuit from ground, pulsing drum 811, armature and front contact of relay 808, armature and front contact No. 2 of relay 812 to conductor 813. Relay 808 and 812 control the start of pulsing. Since the "pick-up" drum 810 is 180° out of phase with the pulsing drum 811, the "pick-up" relay 812 will only be operated between pulses, thereby preventing a mutilated or short pulse as would result if the pulsing drum were connected to the pulsing circuit 813 while said drum is transmitting an impulse.

The ground from pulsing drum 811 is extended over conductor 813 through the winding of relay 317 (Fig 3) to battery, causing the latter relay to operate and release for each pulse of the pulsing drum. It will be noted that the (R') and (T') conductors to selector 304 are connected together through the back contact of relay 317 in series with the winding of polarized relay 318 and through the No. 3 armature and front contact of relay 311 (which is now operated), so normally the circuit including conductors (T') and (R') is closed, thereby holding selector 304 in the conventional fashion. Pulsing drum 811 provides accurately timed dial pulses, and relay 317 follows these pulses, thereby causing selector 304 to be stepped up in accordance therewith, and also to cause subsequent selectors or other equipment to be operated in response to other digits which may follow. This outgoing circuit over (T') and (R') is extended through a front contact of relay 311 so that when relay 309 operates, it will result in the release of selector 304, and the outgoing loop (T') and (R') is closed when the first digit is being dialed, although this may be omitted if the loop through (T') and (R') is closed before relay 309 operates.

It will be recalled that relays 805 and 806 are now operated, designating the digit "6" to be transmitted. Relays 804–807 have armatures and contacts serially connected in such fashion that they control on a decimal basis a connection to any one of armatures of relays 821' to 830', inclusive. It is to be noted that latter relays with their corresponding relays similarly designated without a prime in their reference characters are connected in a familiar counting chain. With 805 and 806 operated, the pulsing circuit 813 is extended via armature and back contact No. 2 of relay 804, armature and front contact No. 3 of operated relay 805, armature and front contact No. 3 of operated relay 806, the armature and back contact of relay 826', through the winding of relay 826 to battery. The first ground pulse transmitted to relay 317 from drum 811 will, therefore, result in the operation of relay 826. This will further result in ground from front contact and armature No. 4 of relay 812 being connected through front contact and armature of relay 826 to the winding of relay 826', connecting the winding of relay 826 and 826' in series, but relay 826' will not now operate since ground is now connected to both sides of its winding. When the first pulse ends, the pulsing ground on the right hand of the winding of relay 826' will be opened, to result in relay 826' operating in series with relay 826. Operation of relay 826' will result in the incoming pulse circuit thereto being transferred at the armature and contact of relay 826' to the armature of relay 825'. The next pulse will cause relay 825 to operate and upon completion of that pulse relay 825' will be operated in the same general manner as described with respect to relay 826 and 826'. As succeeding impulses are received, relay 824 and then 824', relay 823 and then 823', relay 822 and then 822' and finally 821 and then 821' will be operated as the result of the sixth pulse. Upon operation of relay 821' at the end of the sixth pulse, ground is extended from its upper armature and contact through the winding of relay 809 to battery, causing the latter relay to operate and open at its back contact the holding circuit for relays 808 and 812, which will release. Releases of relay 808 will open the circuits from the two interrupters and the release of relay 812 will open at its No. 4 armature and front contacts the operating circuit for relay 803, which will release disconnecting relays 804–807 from conductor group 710. Release of relay 812 will also at its armature and No. 4 contacts open the holding circuit extending to the front contact and armatures of relays 821–830 causing them and their companion "prime" relays to release. The release of relay 821' will release slow-to-release relay 809, it being slow to assure release of relays locked to off-normal ground at its armature and back contact.

It will be recalled that ground was extended from conductor 417, armature and back contact No. 2 of relay 801 via conductor 802 to operate relay 703. When relay 812 operated from the "pick-up" impulse, it extended a ground circuit from off-normal ground ONG at the armature and back contact of relay 809, armature No. 3 and front contact of relay 812 through the upper winding of relay 801 to battery causing the latter relay to operate. This interrupts the ground circuit through its back contact No. 2 from conductor 417 to relays 803 and 703', but this ground circuit has ground multipled to it from contact and armature No. 4 of relay 812 so this ground is sustained during outward pulsing of a digit. But when a digit has been pulsed out, ground over conductor 802 is interrupted by release of relay 812. It will be noted relays 703 and 703' are in a counting chain similar to relays 821–830 with their "prime" relays. When ground is suspended on conductor 802, relay 703' operates in series with relay 703 by a circuit from battery, the winding of relay 703, the winding of relay 703', contact and armature No. 1 of relay 703, armature and back contact No. 1 of relay 704' to off-normal ground.

The operating circuit for relay 801 through its upper winding was opened at contact and armature No. 3 of relay 812, as mentioned. The upper winding of relay 801 is bridged by a condenser 831 in series with a resistance 832 to provide slow-to-release characteristics to it. These characteristics are for the purpose of controlling the interdigital pause, to give time for the selectors in the controlled train the opportunity to hunt an idle trunk beyond or other purposes. When relay 801 releases at the end of the interdigital pause, the ground previously traced from conductor 417 will again be extended through armature and contact No. 2 of relay 801 via conductor 802, serially as previously traced through lower contacts of relays 707'–704' to the armature and front contact No. 1 of relay 703' (now operated), through the winding of relay 704 to battery, causing latter relay to operate. It will be recalled that relays 703 and 703' were operated in series from battery, through the windings of relay 703 and 703' in series, contact and armature No. 1 of relay 703 to off-normal ground ONG at armature and back contact No. 1 of relay 704. The operation of relay 704 will release relay 703, but the impulse which operated relay 704 will maintain relay 703' operated for its duration. The release of relay 703 will disconnect the conductors of conductor group 609 (for digit A') from conductor group 710 and substitutes those from conductor group 610 to conductor group 710 (for digit B'). Since the translated digit (B') is assumed to be a "5," conductors "*a*" and "*b*" will extend ground to correspondingly designated conductors of group 710.

The ground circuit which operated relay 704 which was extended over conductor 802 is also extended through the winding of relay 803 to battery, therefore, causing the latter relay to operate. This relay is slightly slow to operate so as to give opportunity for relay 704 to operate and relay 703 to release before it extends conductors of group 710 to relays 804–807. When relays 804 and 805 operate (for digit 5), ground is again extended from their lower armatures and contacts to operate relay 802, following which relay 812 operates to extend the pulse lead from interrupter 811 over conductor 813 to pulse relay 317 and also to armature and front contact No. 2 of relay 804, armature and front contact No. 2 of relay 805 to the armature of relay 825'. As pulses are transmitted beyond, relays 825 and 825', 824 and 824', etc. are counted down until relay 821' operates to indicate completion of digit "5" whereupon relay 809 is operated to stop out pulsing as has been described. Relay 801, which had previously operated, now starts to release slowly to provide the interdigital pause. The ground extended over conductor 802 will have been suspended as soon as the second digit was transmitted by release of relay 812 to cause relay 704' to operate in series with relay 704, and relay 703', which had been held operated from the ground over conductor 802, its armature and front contact No. 1 through its lower winding to battery, will also release.

When relay 801 is released, the cycle of operations is repeated with an impulse extended over conductor 802, armature and front contact No. 1 of relay 704' through the winding of relay 705 to battery, thereby operating relay 705 and releasing relay 704. Relay 704' will not release at this time, for the ground condition which operated relay 705 is extended through the armature and front contact No. 1 and the lower winding thereof to battery. The third (C') digit is ground on conductor "*d*" (digit "4") of group 710 which is extended through armature and front contacts No. 4 of relay 803 when it operates to operate relay 807. This will result in the pulsing circuit at the armature No. 2 of relay 804 being extended serially through armature and back contact No. 3 of relay 805, armature and back contact No. 4 of relay 806 to armature and contact No. 4 to the armature of relay 824'. This will result in the counting chain including relays 821'–830' counting four pulses, and then stopping the pulses by operating relay 809, as has been described. When the third digit (4) has been transmitted, ground will be interrupted over conductor 802, causing relay 705' to operate in series with relay 705, and relay 704' to release.

Upon completion of the translated data (translation of AB5 into 654), it is necessary to transmit the called telephone number, the first digit of which is recorded on register contacts 405, and the grounded contact 405 (*a* for digit 1) since it is assumed that the called number is AB5–1234. This ground condition is extended over conductor (*a*) of group 413, and when relay 706 is operated in the manner described above with respect to relays 703, 704 and 705, it will cause the out pulsing circuit of Figure 8 to transmit a single digit. In a similar fashion, the last three digits "2," "3" and "4" will be transmitted. Since this functioning will be understood from what has already been described, the registers of Figure 4 for the fifth and sixth digit, and relays such as 706 and 706' for the fifth and sixth digits have been omitted. Relay 707, upon operating, causes the transmission of the seventh digit (4), which is the last digit to be transmitted. Relay 701 was previously operated by the card translator exciting photo-cell 518 which resulted in transmitting ground over conductor (*w*) of group 517 to operate said relay 701, and it locks through its lower armature and contact to off-normal ground ONG, as described. When relay 707' operates after the seventh digit has been transmitted, ground is extended from its contact and armature No. 2, the upper armature and contact of relay 701 to conductor 711 and thence to the sender link 319. This results in the link being released from the line finder-selector circuit. This causes relay 310 to release and subsequently relay 313 will release, opening at its front armature and contact No. 1 off-normal ground ONG, thereby causing the release of all relays of the sender which are locked to off-normal ground.

It is to be noted that conductors of group 517 may be selectively energized to operate a relay such as 701 to predetermine the number of digits to be transmitted.

Each of these relays (with the exception of relay 702 is adapted to interconnect a ground contact of a relay such as 703 (digit "1") to conductor 711, so when that relay operates at the completion of a digit the operated relay such as 701 results in the signal to link 319 to disconnect the sender from the line finder-selector circuit.

When the link 319 disconnects the sender from the line finder-selector circuit, conductor 308 is opened resulting in relay 309 releasing to again connect "T" and "R" conductors from the line finder directly to the first selector. It will be recalled that relay 306 has previously operated and locked up to sleeve "S" ground, so the start circuit 307 for the link is, therefore, open preventing reseizure of the link.

*Restoration of key register*

The register of Figure 4 has been left with the called number AB5–1234 standing on its registration contacts, and must be restored to normal. When relay 313 releases upon completion of the sender functions, ground is extended from armature and the back No. 1 contact of relay 313, conductor 320 to register off-normal contacts 418. If the register is off-normal (as it now is), the upper contact of off-normal contacts 418 will be closed and the above-traced ground will be extended through back contact and armature of stepping magnet 33 for digit registering arm 31 (not shown), through the winding of said magnet to battery, causing it to operate and release repeatedly until the register switch restores to normal, whereupon off-normal contacts 418 will be opened to interrupt the just-mentioned stepping circuit for magnet 33. But if the switch stops at this point, it will still contain on its contacts the called number AB5–1234. It is necessary for it to make a full revolution to restore these closed contacts to normal. With switch 418 off-normal (its upper contact closed) the ground on conductor 320 will be extended through the back contact and armature of relay 419 through the winding of relay 420 to battery causing said relay to operate. Relay 420 at its upper armature and contact provides ground to contact No. 1 of relay 33 in multiple with that from conductor 320. Consequently, when the register switch reaches normal and off-normal switch 418 breaks its upper contact, the switch will not stop rotating. As it passes through normal, switch 418 momentarily closes its lower contact which extends ground from conductor 320, lower contact of 418, the lower armature and contact of relay 420 through the winding of relay 419 to battery, causing latter relay to operate and, therefore, to break the above-traced operating circuit for relay 420 which after a moment and after the register switch has been stepped off-normal for its second revolution, since relay 420 is slightly slow to release. Relay 419 locks up to the upper contact of 418 and ground on conductor 320. Relay 419 is slightly sluggish so that it will remain operated for the short interval while switch 418 is changing from its lower to its upper contacts as the switch passes through its normal position. At the end of its second revolution, the register will find relay 420 in a released condition so it will stop in its normal position upon switch 418 opening its upper contact. Relay 419 will now release since it was locked up to the upper contact of switch 418, which is now normal (in the position shown) since the register is normal. When the register is normal, it is in such position that the first train of dial pulses will result in that digit being registered by closure of contacts of contact group 401.

It will be noted from the disclosure of my Patent No. 2,301,823 that as the digit registering arm 31 thereof is rotated its attached bar 44 will come in contact with any operated switch members such as 25 and will restore them to normal. Consequently, all switch members such as 25 will be opened upon a complete revolution of the digit registering arm. It will be noted that the device of latter mentioned patent will require off-normal contacts such as 418. These may obviously be provided. The code drum of said patent shows off-normal contacts 57—58 associated therewith, and similar contacts may be provided in connection with the digit registering arm 31 thereof.

It may be found appropriate to prevent the sender being seized for another call prior to full restoration of the register. This may be accomplished by extending to link 319 ground from conductor 320 through an armature of relay 420 and/or an armature of relay 419 in multiple, to operate a relay (not shown) in said link which will prevent use of that sender until the relays last mentioned are released, indicating that the register is normal.

*Toll dial call*

Where customer toll dialing is provided for, it is desirable for the customer to dial at one time the full code to reach the desired distant party, and this invention is well-adapted to meet this requirement. A nationwide toll call requires ten digits (as mentioned above) in the general form of XIX–ABC–XXXX. The "XIX" is the area code, the first digit "X" being any digit "2" to "9," inclusive, and the second "X" any digit "1" to "0," inclusive. The middle "I" may be a "0." The remainder of the number (ABC–XXXX) will be transmitted untranslated.

The register of Figure 4 will have capacity for ten digits, and it will be assumed that the toll call will be to number 715–MA3–1234. These digits will be registered by the register of Figure 4. When the area code (715) has been dialed, the operation of relay 407 and/or 408 will attach a card translator as has been described. The code "715" will be translated into any desired code as required by the trunking plan, and here it will be assumed to be "531" for switching purposes. The card translator will set up the code for "5" on conductor group 514, that for "3" on group 515 and that for "1" on group 516. It will also energize photo-cell 520 to indicate to the sender that after routing the call to the toll dialing equipment the sender must send to such equipment the full, untranslated number which has been registered. Excitation of photo-cell 520 will result in extension of ground over conductor (*u*) of conductor group 517 to result in the operation of control relay 702, which will lock up to off-normal ground ONG by way of its own armature and front contact No. 2, armature and back contact No. 4 of relay 705′ to off-normal ground ONG.

The card translator will also energize photo-cell 519 to operate a relay (not shown) such as 701 to provide for transmitting ten digits before the sender is dismissed. The sender will actually transmit 13 digits, but this apparent discrepancy will be treated below.

The sender will register "5," "3" and "1" from the translator on register relays (A′), (B′) and (C′) of Figure 6, and the card translator will be released. It will then proceed to transmit them to the switches beyond, as has been described above, and with each digit will count down the control relays 703 and 703′ for the first digit, 704 and 704′ for the second and 705 and 705′ for the third. When relay 705′ operates at the conclusion of the third digit, at its armature and contact No. 1, it opens the ground circuit which holds relays 705 and 705′ operated, causing them to release. Relay 705′ is slow to release, so it will maintain its contacts closed for a moment after the above described circuit through its armature and contact No. 1 is opened. Relay 702 is operated, as described, and locked up under control of relay 705′. Relay 702 is slightly slow to release, but when its locking circuit is opened by opening of the circuit through armature and contact No. 4 of relay 705′, it will release before relay 705′ releases. With relay 705′ and 702 operated, a circuit may be traced from ground at contact and armature No. 6 of relay 705′, armature and contact No. 1 of relay 702, conductor 712 through the upper winding of relay 608 to battery, causing the latter relay to operate and lock up to off-normal ground ONG via its lower winding, armature and contact No. 7. It will be noted that with relay 608 normal at back contacts Nos. 1, 2, 3 and 4 it extends ground to conductor group 609, for the first translated digit, the registration indicated by operated relays of the (A') digit. With relay 608 operated, is substitutes the conductors of conductor group 410 at its front contacts and armatures Nos. 1, 2, 3 and 4, and extends these over conductor group 609 to the control circuit of Figure 7. Conductor group 410 carries the untranslated registration of the first digit from register 401 of Figure 4.

Likewise, the connections from register relays for digit (B') of Figure 6 are opened by operation of relay 608 at back contacts Nos. 5, 6, 8 and 9 and the conductors of conductor group 411 are substituted therefor at the front contacts respectively and are extended to the control circuit of Figure 7 over conductor group 610. In the same manner, conductor group 412 is connected to conductor group 611 by operation of relay 608. Conductor groups 411 and 412 carry the code for the second and third digits registered in the register of Figure 4. There now appear on armatures of relays 703, 704 and 705, respectively, when they operate, the first three digits which were dialed, i. e., "715." The control relays such as 702 of Figure 6 are now released, with the exception of a relay similar to 701 to indicate ten digits are to be transmitted. It was mentioned that 13 digits required transmission by the sender, yet the operated relay similar to 701 indicates only ten are to be transmitted. It will be observed, however, that the first three digits (531) required to route the call to the toll dial equipment resulted in the digit count of said first three digits not being considered since the third digit relays 705 and 705' are released after the third digit is transmitted, so that the count for ten digits begins after three digits have been transmitted.

Since ten is the maximum number of digits which it is assumed can be registered, it is not really necessary to have a relay similar to relay 701 to release the sender after ten digits, but an extra armature and front contact on a relay similar to 707' will connect ground to conductor 711 when it operates at the end of the tenth digit, thereby to dismiss the sender.

The sender will now transmit untranslated the ten digits registered in the register of Figure 4 to the toll dial equipment, which may be assumed to be of the common control type having a sender to receive and register these ten digits.

For customer toll dialing, it may be desirable for the customer to omit dialing the area code for offices within his numbering plan area. It is conventional that within a numbering plan area there will be no two offices with the same office code (ABX). If the area code is omitted on such calls, the register of Figure 4 will receive and register seven digits (ABX–XXXX) as for a local call, as explained in detail. Since there will be no conflict in the office designations (ABX) between the offices in his own exchange and those in other exchanges within his numbering plan area, there will be no conflict between a local call and a toll call in the same numbering plan area in the translation of the office code (ABX). With such an arrangement, the card translator will translate the office code (ABX) into an arbitrary three digit routing code to reach the toll dialing equipment, will operate relay 702 to cause the transmittal after the routing code of the completely registered number and will operate a relay such as 701 to indicate that seven digits are to be transmitted (although ten digits will actually be sent forward, including the routing code to the toll dialing equipment which, as explained above, is not included in the seven digit count).

The equipment will operate in the detailed manner described above. It is to be understood that the routing code to the toll dialing equipment need not be on a 3-digit basis, but may be either one, two or three digits, as required by the trunking plan. This may require expansion of the card translator so that additional relays such as 702 may be provided and operated to control the transmittal of the registered, untranslated information contained in the register of Figure 4 after routing codes of one, two or three digits have been transmitted.

It is common practice to use multi-frequency pulsing into common control toll dialing equipment, into crossbar offices or into crossbar tandem units. By multi-frequency pulses (commonly referred to as M. F.) is meant combinations of frequencies in the voice frequency range. Such frequencies may be 700, 900, 1100, 1300 and 1500 cycles per second, and a pair of these will define a digit. Each of these frequencies may be designated respectively as "0," "1," "2," "4" and "7" in accordance with the "two-out-of-five" code, and a pair of these frequencies will define the digit in accordance with the sum of their designations. It is contemplated that the sender of the present invention may be adapted to transmit step-by-step pulses as required to operate step-by-step switches, and when a unit of common control equipment is reached, it will thereafter transmit M. F. pulses. An example of many feasible arrangements is where a step-by-step toll switching system is employed, which works into a distant common control switching system. As mentioned above, the first translated digit transmitted may be employed to reach the toll dial switching unit and the next two to reach the desired distant city where it is assumed that a common control unit is located. When this latter point is reached after three digits have been transmitted, the sender following advice from the card translator, will transmit to the latter point the entire registration in the register of Figure 4 as multi-frequency pulses. This will require a relay such as 702 which will cause the registration contacts of the register of Figure 4 to be connected to the out pulse circuit of Figure 7, as has been described, and the out digit control circuit of Figure 8 will be arranged to send multi-frequency pulses. Under this controlled connection, the pulse counting chain will not be employed, but the digit codes on conductor group 710 will actuate a group of decoding relays to change the received "one-or-more-out-of-four" code into the "two-out-of-five" type and will extend from five frequency sources the M. F. conditions defining the out pulses. These will be impressed on the outgoing circuit to the selectors of Figure 3 by means of a transformer having its secondary connected in said outgoing circuit and its primary connected to the frequency sources through contacts of latter said relay group. The digit control counting chain Figure 7 will be counted up as each digit is transmitted and with each count it will supply the next digit code over conductor group 710, until the proper number of digits has been transmitted, whereupon it will cause the sender to release, as has been described. It is believed that the practiced in this art may readily make the changes which have been outlined above in view of the detail disclosure of this specification and drawings. Likewise, this arrangement may be adapted to transmit step-by-step impulses at the regular rate until common control equipment is reached, whereupon it may transmit them at a higher rate and with a shorter interdigital interval.

If the toll dial equipment is of the step-by-step or similar type without a register or sender, the translator can translate the area code (first three digits dialed) into three digits, the first of which will be a routing digit to reach the toll dial equipment, requiring that the toll dial equipment be reached over a level of the first selector 304. The other two digits will be arbitrarily selected to route the call to a distant city. This will permit a total of 100 distant cities to be selected.

It will be understood that where the originally registered, untranslated number is to be transmitted beyond after other than three digits of routing code (say after one or two digits) it will be necessary to have a relay such as 702 which will be operated and locked up to added back contacts on relay 703' for one digit or added back contacts on relay 704' for two digits, in the same manner that relay 702 is locked up to armature and back contact No. 4 of relay 705' and connected in the counting chain as with relay 702 so that when one digit or two digits have been transmitted, the counting chain will be released and the digits as registered in the register of Figure 4 will be transmitted untranslated. It will be understood that said added relay or relays will also cause the operation of relay 608 when the proper number of translated digits has been transmitted, as with relay 702 for three digits.

*Start signal*

Step-by-step digit impulses as contemplated as being sent out by the sender of this invention are rapidly transmitted, with a minimum interval between digits for the interdigital pause. There may be in the network a link type office or one (such as a common control toll dialing unit) requiring a sender to be connected to the incoming trunk before digits can be received and registered. It is necessary, therefore, to signal the sender disclosed herein that the distant sender or the link type office is ready to receive impulses. One means for effecting this is disclosed.

It is common practice to have reversed battery furnished on trunks to link or sender type offices until the link or sender is ready to receive pulses. It will be noted in Figure 3 that polarized relay 318 is connected in the outgoing (T') and (R') loop which is pulsed by relay 317. As long as the equipment beyond is in condition to receive pulses, the direction of current flow through relay 318 will be such as to result in latter relay remaining unoperated. If the circuit extension reaches a link or sender type office, the direction of current through relay 318 will be reversed and this relay will operate when said link or sender type office is reached. This will extend ground from its armature and contact over conductor 321 through the lower winding of relay 801 to battery. It will be recalled that relay 801, by virtue of its slow-to-release characteristics, provides the interdigital pause. The circuit just described over conductor 321 will prevent relay 801 releasing until the start signal is provided from the equipment beyond changing the direction of current to release relay 318, thereby indicating that it is ready to receive digits.

*"0" Operator*

It seems unnecessary to translate calls to the assistance or "0" operator, who is commonly reached by dialing "0." This digit "0" will be registered on contacts in the first position 401 of the register of Figure 4. If a "0" is dialed, contacts (*a*) and (*d*) will be grounded in accordance with the "one-or-two-out-of-four" code. These contacts are connected to the two windings of marginal relay 421. Current through either one of its windings alone will not operate the latter relay, but the windings are in cumulative direction, so current through both of them will cause it to operate. Operation of relay will extend ground over conductors (*e*) and (*f*) of conductor group 422. Ground on conductor (*e*) will operate relay 608, which connects the first three register positions of the register of Figure 4 to the control relays of Figure 7. Only the first register 401 will be effective by dialing a single "0," so ground on the (*a*) and (*d*) conductors (for "0") of conductor group 609 will be connected to armatures Nos. 2 and 5 of relay 703 to result in a "0" being subsequently transmitted to the equipment beyond.

Ground on conductor (*f*) will operate relay 713, through its winding to battery. This relay will lock up over its lower armature and contact to off-normal ground ONG. This indicates that only one digit is to be transmitted beyond. When the "0" is pulsed beyond, relay 703' operates which extends ground from its contact and armature No. 2 through the upper armature and contact 713 to conductor 711 which, it will be recalled, results in the sender being disconnected.

It will be recalled that a translator is connected to the sender following the registration of the third digit which has been dialed to result in relay 407 and/or 408 being operated. Consequently, the dialing of "0" will not result in the use of a card translator. Ground on armature and contact No. 1 of relay 421 will operate relay 409 over an obvious circuit to similate completion of card translator functions.

*Preliminary impulse*

It is conventional practice to provide in step-by-step areas service codes in the series "11X," i. e., long distance "110," information "113," repair clerk "114," etc. A preliminary impulse is an accidental dialing of a "1" or inadvertently operating momentarily the hook switch or handset contacts. The described sender does not include facilities for absorbing a preliminary impulse, but may be modified so to do. One method will be to have the register of Figure 4 arranged for eleven digits. If a "1" is first registered (code "a") this can be detected by a pair of relays which will indicate the presence of ground on conductor "*a*" only. If a "1" is also registered in the second register 403, it may likewise be detected, indicating that a service code is being dialed requiring nothing special to be done, since the card translator will translate the service code "11X" and extend the connection to the desired service point. But if the second digit is other than a "1," it indicates that a preliminary impulse has been received. This can readily be detected by the added relays mentioned, and the presence of other than a "1" in this register position will be effective to operate a relay which will result in the shifting of registration down one position on the register, leaving the first register ineffective. That is, this relay will disconnect conductor group 410 from register contacts 401 and connect it to contacts 403; will disconnect conductor group 411 from register contacts 403 and connect it to register contacts 404, and so on. Relays 407 and 408 will have to be transferred to register 405, together with conductor group 412. Likewise, relay 421 will have to be shifted to register contacts 403. In this fashion, the register contacts will be shifted one register position down in the order, leaving contacts 401 unused after a preliminary impulse has been detected, and will connect the eleventh set of contacts to conductor group 414. It is believed that this modified arrangement will be understood by those practiced in the art and a detailed showing of it is not necessary.

*Overtake prevention*

It is expected that the operation of the sender and card translator will be very fast after three digits have been dialed. The subscriber who is dialing may be slow, or pause during dialing, to result in the outgoing pulses "overtaking" the incoming ones. My Patent No. 2,301,823 makes provisions for stopping outgoing impulses when dialing is slow, and the present invention is so equipped.

The register of Figure 4 has a switch 424 provided with a wiper, or the equivalent, said wiper being advanced as the digit registering arm 31 (of said patent) is advanced to each registering position. The bank contacts are extended over conductor group 425 to armatures and front contacts (generally No. 3) of relays such as 703 and 704 of Figure 7. When one of said relays operates, it extends ground over a conductor of conductor group 425 to a corresponding terminal of bank 424, so if the wiper of switch 424 is resting on the corresponding terminal this ground will be extended through the winding of relay 416 to battery, thereby operating relay 416. This relay at its back contact opens the ground ONG at the front contact of relay 409 over conductor 417, armature and back contact No. 2 of relay 801 to conductor 802. It will be recalled that ground on conductor 802 operates successively relays 703, 704 and so on for each successive digit. Ground withheld from conductor 802 will prevent operation of the next relay in the series 703, 704, etc., to cause a digit to be transmitted. As soon as another digit is registered, switch 424 will be advanced a step, resulting in the release of relay 416 and the start of pulsing another digit. It will be seen that for each digit transmitted, a relay such as 703', 704' etc., will test the position of digit registering arm 31 to see that it is not waiting to register a digit on the contacts from which relays 703, 704 etc., seek to transmit a digit.

The latter mentioned patent shows contacts such as 12 and 13 which are operated by arm 31, and such an arm and contacts in proper arrangement are considered to be fully equivalent of the rotary switch 424 used to facilitate the explanation of the functions involved in preventing "overtake."

*No office code*

It may be that the customer will dial inadvertently an office code which does not exist as a working office in the local numbering plan area. It is planned to care for this by providing the card translator with data cards for all possible numbers which may be dialed. Those codes which are not effective to reach a working office will be translated into a code to reach either a "no-such-number" tone or an intercept operator. A "no-such-number" tone may be a clearly distinguishable tone, such as short spurts of a rising pitch tone or "squeal," and this tone may be connected to a level of a third selector. Whenever a non-existent office is dialed, the translator will provide a three digit code to reach said terminal. Likewise, if it is desired to route such calls to an intercept operator, the translator will provide the proper code for this purpose.

*Conclusion*

This invention has been described in detail in its application to a step-by-step dial system, but it is understood that it is applicable to other types of dial systems and to toll dial switching systems. The flexibility of the application of the invention is indicated by the fact that various numbers of digits may be transmitted and the device will "cut back" after various numbers of translated digits have been transmitted and will then transmit the originally registered digits untranslated. It is to be further understood that the above-described arrangements are but illustrative of the application of the principles of the invention. Numerous other arrangements may be devised by those skilled in the art without departing from the spirit and scope of the invention.

What is claimed is:

1. A dial telephone sender including a register to register a wanted telephone number, outgoing switching control means, a card translator comprising data and block cards with means to selectively displace them, means to interconnect said register and said selective means in said card translator to selectively displace a data card in response to the registration of two of the first three digits of the wanted telephone number in said register and to selectively displace a block card in response to the registration of the third of said first three digits in said register, and scanning means for said displaced cards to control jointly with said register said outgoing switching control means.

2. A dial telephone sender including a primary register to register the digits of a wanted telephone number, a switching control circuit, a data translator including a plurality of displaceable cards bearing sensible information designations, electro-mechanical means controlled by said primary register to selectively displace said cards in pairs, a secondary register, scanning means common to all of said cards to sense information corresponding to the selected pair of cards which has been displaced, means controlled by said scanning means to register in said secondary register said information and means controlled by said primary register and said secondary register to control said switching control circuit.

3. A dial telephone sender including a primary register to register the digits of a wanted telephone number; a switching control circuit to control the establishment of a telephone connection, a data translator including a primary set of displaceable record cards, each bearing sensible information, a secondary set of displaceable cards in alignment with first said set, electro-mechanical means controlled by said primary register to selectively displace a card in each said set, scanning means responsive to the displacement of a card in each said set to sense a portion of the information on the displaced card of the first said set determined by the card in the second said set which is displaced, a secondary register operatively connected to said scanning means to register the sensed information and means controlled by said primary register and said secondary register to control said switching control circuit.

4. In a dial telephone system having dial lines, selectors to which a dial line when calling may be connected, a sender, means to connect a sender to a selector to which a calling line is connected, a register in said sender to register a number which may be dialed over said calling line, a card translator, means to connect said card translator to said register when three digits have been registered, scanning means for said cards, means responsive to two of said three registered digits to cause a data card corresponding to said two digits to be positioned for scanning, means responsive to the third of said three digits to position a card which blocks from scanning a portion of the data on said displaced data card and a register for information scanned from said positioned data card under control of said block card.

5. A dial telephone sender including a primary register to register a wanted telephone number, outgoing switching control means, a card translator including data and block cards with means to selectively displace individual ones of said cards, means interconnecting said primary register with said means to selectively displace said cards to displace a data card in response to the registration of two of the first three digits of the wanted telephone number and to displace a block card in response to the third of said first three digits, a secondary register operatively connected to said card translator, scanning means to sense said displaced cards and to register in said secondary register translated information determined by said data and block cards which are displaced, and means controlled jointly by said primary and secondary registers to control said outgoing switching control means.

6. A step-by-step dial central office system including a line finder to which a subscriber's line is connected when a call is initiated thereover and having an outgoing circuit to a step-by-step selector, senders, card translators, a link to interconnect said outgoing circuit with an idle one of said senders and a link to interconnect any of said senders with an idle one of said card translators, a register in said sender to register a wanted telephone number and means to actuate said card translator under control of said register to translate a portion of said wanted telephone number into a routing code to actuate said selector.

7. A step-by-step dial central office system including a line finder to which a subscriber's line is connected when a call is initiated thereover and having an outgoing circuit to step-to-step telephone circuit selecting means, senders to control said circuit selecting means, card translators, a link to interconnect said line finder and said circuit selecting means with an idle sender, a register in said sender to register a wanted telephone number, a link to interconnect a sender which has registered a portion of a wanted telephone number with an idle card translator, means to actuate said translator to translate a portion of the wanted telephone number into a switching code, a secondary register in said sender to register said switching code and means controlled by latter said register and first said register to actuate said telephone circuit selecting means to interconnect the calling subscriber's line with the wanted number.

8. In a idal telephone system, a dial telephone sender including a primary register to register incoming dial digits designating a wanted telephone number, dial switching equipment connectible to said sender, a card translator, a link to inter-connect said sender with said card translator, a secondary register in said sender, means controlled by said primary register when latter said register has registered a predetermined number of digits of the wanted telephone number to actuate said link to connect said card translator to said sender and to transfer to said card translator a code designating the magnitude of each of said digits of said predetermined number of digits to actuate said card translator to translate latter said digits into information including digits in accordance with a code and a designation of the total number of digits required to reach the wanted telephone, means to register the magnitude of latter said digits and the total number of said digits in said secondary register of said sender, a transmitting circuit in said sender controlled by said primary register and said secondary register to transmit the digits registered in said secondary register as step-by-step impulses to control a portion of said dial switching equipment and to transmit digits regstered in said primary register to control another portion of said dial switching equipment.

9. In a dial telephone system, a register for registering the digits of a wanted telephone number, a translator, means to operatively connect said translator to said register upon the registering in said register of a predetermined number of digits, means to actuate said translator to translate said predetermined number of digits into a switching code, telephone connection switching means, means to transmit to said switching means said switching code as step-by-step impulses, and means responsive to the completion of transmittal of said step-by-step impulses to transmit all of the digits of said wanted telephone number.

10. A step-by-step dial central office system including a line finder by which any one of a plurality of dial lines when calling is found, a train of step-by-step selectors, a circuit interconnecting said line finder with a first selector in said train, a plurality of senders, a link to interconnect an idle one of said senders to a line finder employed to find a calling line, a register in said sender responsive to the actuation of the dial by a calling subscriber to register a wanted number, a plurality of card translators each containing data and block cards, a link circuit connected to each sender and each card translator arranged to interconnect an idle card translator and a sender having a dial call at least partially registered in it, means in said card translator to cause a data card and a block card to be selected and scanned in response to the first three digits registered in the sender to result in the development of translated information corresponding to said first three digits, a second register in said sender connected through latter said link to said translator for registering said translated information, a dial pulsing circuit controlled by latter said register to transmit to said train of selectors the translated information corresponding to the first three digits which have been dialed and the digits beyond the first three which have been registered in first said register, means to disconnect the card translator from the sender when said card translator has completed its functions and means to disconnect said sender from the line finder when said sender has completed its functions.

11. A dial telephone sender including a primary register to register the digits of a wanted telephone number, pulse controlled communication circuit switching means operatively connected to and controlled by said sender, card translators, a secondary register in said sender, a link to interconnect said sender and an idle card translator under control of said primary register when latter said register has registered a predetermined number of digits, means to transfer by a code the digits of said predetermined number of digits to actuate said card translator to translate said digits into a switching code, means to register said switching code in said secondary register, a step-by-step pulse transmitting circuit, relay means responsive to said secondary register registering said switching code to control said pulse transmitting means, to actuate said switching means in accordance with said code, and relay means responsive to completion of transmission of the code registered in said secondary register to cause said digital pulse transmitting circuit to transmit as trains of pulses all of the digits registered in said primary register.

12. A dial telephone sender including a register to register a wanted telephone number, outgoing switching control means, a card translator comprising data and block cards with means to selectively displace them, means to interconnect said register and said selective means in said card translator to selectively displace a data card in response to the registration of two of the first three digits of the wanted telephone number in said register and to selectively displace a block card in response to the registration of the third of said first three digits in said register, scanning means for said displaced cards to control jointly with said register said outgoing switching control means to transmit step-by step impulses followed by multi-frequency impulses to designate the wanted number.

References Cited in the file of this patent

UNITED STATES PATENTS

| | | |
|---|---|---|
| 2,364,445 | Hubbard | Dec. 5, 1944 |
| 2,519,688 | Mitchell | Aug. 22, 1950 |
| 2,558,577 | Myers | June 26, 1951 |